Patented June 3, 1952

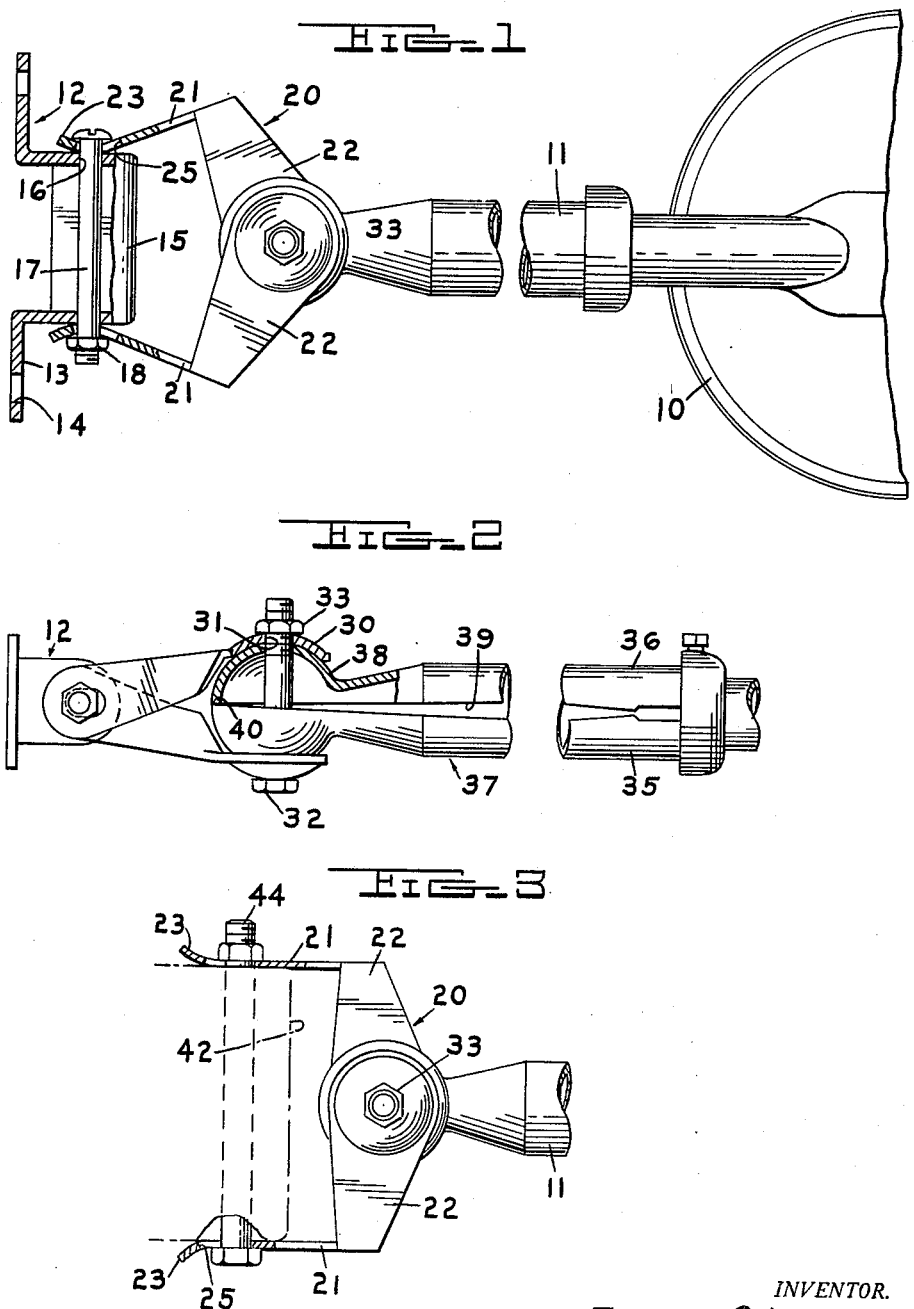

2,599,306

UNITED STATES PATENT OFFICE 2,599,306

MIRROR MOUNTING STRUCTURE

Thomas C. Whitehead, Detroit, Mich., assignor to Whitehead Stamping Company, Detroit, Mich., a corporation of Michigan Application November 1, 1948, Serial No. 57,655

5 Claims. (Cl. 248—276)

The present invention relates to mirror mounting structure, and more particularly to pivot support structure for securing one end of the mirror arm to a motor vehicle.

It is an object of the present invention to provide pivot support structure which is provided with an attaching bracket for mounting the same to the side of a vehicle or which may be mounted directly to the door hinge structure of the vehicle without using the mounting bracket.

It is a further object of the present invention to provide pivot structure of the character described characterized by the superior frictional resistance to turning which insures retaining the mirror in adjusted position against vibration and the like.

It is a further object of the present invention to provide a pivot support structure characterized by the relatively few number of parts employed, the fact that identical elements are employed, and the adjustability of the support for the accommodation of hinge members of different height.

Other objects and features of the invention will become apparent as the description proceeds, especially when considered in conjunction with the accompanying drawings, wherein:

Figure 1 is a rear elevation of the mirror mounting structure, with parts in section;

Figure 2 is a fragmentary plan view of the structure, with parts in section; and Figure 3 is a fragmentary view similar to Figure 1 showing the structure associated with a hinge of a height different from the supporting bracket illustrated in Figure 1.

Referring now to the drawings, there is illustrated a mirror 10 provided with an extensible arm indicated generally at 11 which is supported by the pivot support structure. The pivot support structure comprises a mounting bracket 12 which is provided with ears 13 having apertures 14 therein by means of which the bracket may be attached to the side of the vehicle. Intermediate the ears 13 is an offset portion 15 provided with openings 16 for receiving a supporting bolt 17 which is provided with a nut 18. The structure for connecting the extensible arm 11 to the bracket 12 (or the door hinge of a vehicle, if such is preferred) comprises a pair of identical mounting elements 20, each of which has a generally flat arm portion 21 and a second generally flat arm portion 22 which extends from one side of the arm portion 21 at an end thereof and occupies a plane perpendicular to the plane occupied by the first arm portion. The ends 23 of the first arm portions are curved away from each other, as indicated in Figures 1 and 3, and are provided with elongated slots 25 for receiving the bolt 17.

The second arm portions referred to are preferably provided with spherical shaped seat portions 30, each of which is provided with a central opening 31 for the reception of an assembly bolt 32 which is secured thereto with a nut 33.

The extensible arm 11 is composed of two sheet metal parts 35 and 36 of semicircular cross section, the major portion of which, as indicated at 37, is semicylindrical and end portions of which, as indicated at 38, are generally hemispherical. The confronting edge portions 39 of the parts 35 and 36 are shaped to be spaced apart in final assembly except at the extreme end portions of the hemispherical parts 38 where the edge portions abut, as indicated at 40. It is important that the edge portions 39 be spaced apart for at least a substantial distance longitudinally of the arm 11 away from the point of abutment 40.

The construction just described permits a very excellent type of frictional resistance to turning. Due to the generally spherical shape of the end of the arm 11, it has extended surface contact with the interior surfaces of the spherically shaped seats 30. Moreover, when the nut 22 is tightened down to exert pressure through the spherical seats 30 to the hemispherical portions 38, the ball end will be compressed, this compression being effected by pressing the parts 35 and 36 toward each other. Since this compression of the parts is resisted by their natural resiliency, a construction is provided in which the ball is resiliently retained in extended surface-to-surface contact with the interior of the spherical seats 30.

Inasmuch as the members 20 are independently adjustable about the axis of the assembly bolt 32, these arms may be readily swung from the position illustrated in Figure 1 to the position illustrated in Figure 3 or to any intermediate position. In Figure 1 the elements 20 are shown assembled with the bracket 12 which is preferably provided with the structure. However, if it is preferred to mount the arm 11 on a door hinge such as indicated at 42 in Figure 3, the elements 20 may be swung apart to accommodate the greater height of the door hinge 42. Moreover, the elongated slots 25 which lie partly in the flat portion of the arm 21 and partly in the curved portion 23 thereof contribute to the utility of the structure in accommodating it to mounting means of different height, such for example as the bracket 12 or the hinge 42. Thus when the arm portions 21 extend toward each other as indicated in Figure 1 the bolt 17 will extend through the portion of the slot which extends into the curved portion 23 of the arms. However, when the arms are swung apart to accommodate the relatively greater height of the hinge bracket 42, the supporting bolt 44 passes through the portion of the slots 25 which occupy the flat portion of the arms 21.

It will be observed that the arms 20 are identical, which of course contributes to the economy with which the structure may be produced. Moreover, the fact that the arms are adjustable about the axis of the assembly bolt 32 greatly increases the utility of the structure, since it may be accommodated to hinge structures of different height. Finally, the structure which results in the resilient compression of the ball made up of the hemispherical portions 38 between the spherically shaped seats 30 provides a structure in which frictional resistance to turning will be an inherent property of the structure and will not be reduced by wear of the parts. Moreover, the provision of the ball and socket type structure provides for separation of the points of contact between the arm 11 and the members 20. This makes the structure more resistant to twisting and distortion.

The drawings and the foregoing specification constitute a description of the improved mirror mounting structure in such full, clear, concise and exact terms as to enable any person skilled in the art to practice the invention, the scope of which is indicated by the appended claims.

What I claim as my invention is:

1. Pivot mounting structure comprising an arm having a head at one end thereof provided with an opening therethrough, a pair of identical members having at one end friction portions engageable with opposite sides of said head, said friction portions having apertures therein in registration with the opening through said head, an assembly bolt extending through said opening and apertures and establishing a pivot connection between said members relative to said head, and between said members relative to each other, the opposite ends of said members comprising offset opposed mounting portions movable toward and away from each other upon relative swinging movement of said members about the axis of said assembly bolt, said mounting portions having opposed openings therein for the reception of a supporting bolt with its axis perpendicular to the axis of said assembly bolt.

2. Structure as defined in claim 1 in which said head and said friction portions are spherical.

3. Structure as defined in claim 1 in which said mounting portions are curved away from each other and the opposed openings therein are elongated slots extending along said curved portions to receive the supporting bolt extending through mounting brackets of different dimensions measured parallel to the supporting bolt.

4. Structure as defined in claim 1 in which said members are formed of flat stock, opposite end portions of which are offset and occupy planes disposed at right angles to each other.

5. Pivot mounting structure comprising an arm having a head at one end thereof provided with an opening therethrough, a pair of identical members each having a friction portion and a mounting portion spaced from said friction portion, the friction portions of said members being engageable with opposite sides of said head and having apertures therein in registration with the opening through said head, an assembly bolt extending through said opening and apertures and establishing a pivot connection between said members relative to said head, and between said members relative to each other, said mounting portions being offset from said friction portions, opposed to each other, and disposed in planes parallel to the axis of said assembly bolt, and movable toward and away from each other upon relative swinging movement of said members about the axis of said assembly bolt, said mounting portions having opposed openings therein for the reception of a supporting bolt with its axis perpendicular to the axis of said assembly bolt.

THOMAS C. WHITEHEAD.

REFERENCES CITED

The following references are of record in the file of this patent:

UNITED STATES PATENTS

| Number | Name | Date |
|---|---|---|
| 208,254 | May | Sept. 24, 1878 |
| 717,895 | McClain | Jan. 6, 1903 |
| 1,883,287 | Zink | Oct. 18, 1932 |
| 2,134,016 | Zink | Oct. 25, 1938 |
| 2,289,154 | Van Cise | July 7, 1942 |

FOREIGN PATENTS

| Number | Country | Date |
|---|---|---|
| 118,480 | Australia | May 18, 1944 |